United States Patent [19]

Jackson, Jr.

[11] Patent Number: 5,277,440
[45] Date of Patent: Jan. 11, 1994

[54] AIR BAG RETENTION DEVICE

[76] Inventor: Thomas S. Jackson, Jr., 344 Tartan St., Longwood, Fla. 32750

[21] Appl. No.: 925,657

[22] Filed: Aug. 7, 1992

[51] Int. Cl.⁵ .......................................... B60R 21/02
[52] U.S. Cl. ..................................... 280/727; 74/558; 280/750
[58] Field of Search .................. 280/731, 727, 750; 74/558, 552

[56] References Cited

U.S. PATENT DOCUMENTS

| | | | |
|---|---|---|---|
| 1,927,913 | 9/1933 | Bennett | 74/558 |
| 1,997,738 | 4/1935 | Maxedon et al. | 74/558 |
| 3,437,350 | 4/1969 | Clark | 280/750 |
| 5,131,290 | 7/1992 | Atkinson | 74/558 |

Primary Examiner—Eric D. Culbreth
Attorney, Agent, or Firm—James H. Beusse

[57] ABSTRACT

A method and apparatus for inhibiting full deployment of a vehicle air bag during a rescue operation utilizing a cover which can be tightly fitted and fastened about a vehicle steering wheel so that an activated air bag is confined within the cover and substantially inhibited from deploying into the driver area of the vehicle.

8 Claims, 1 Drawing Sheet

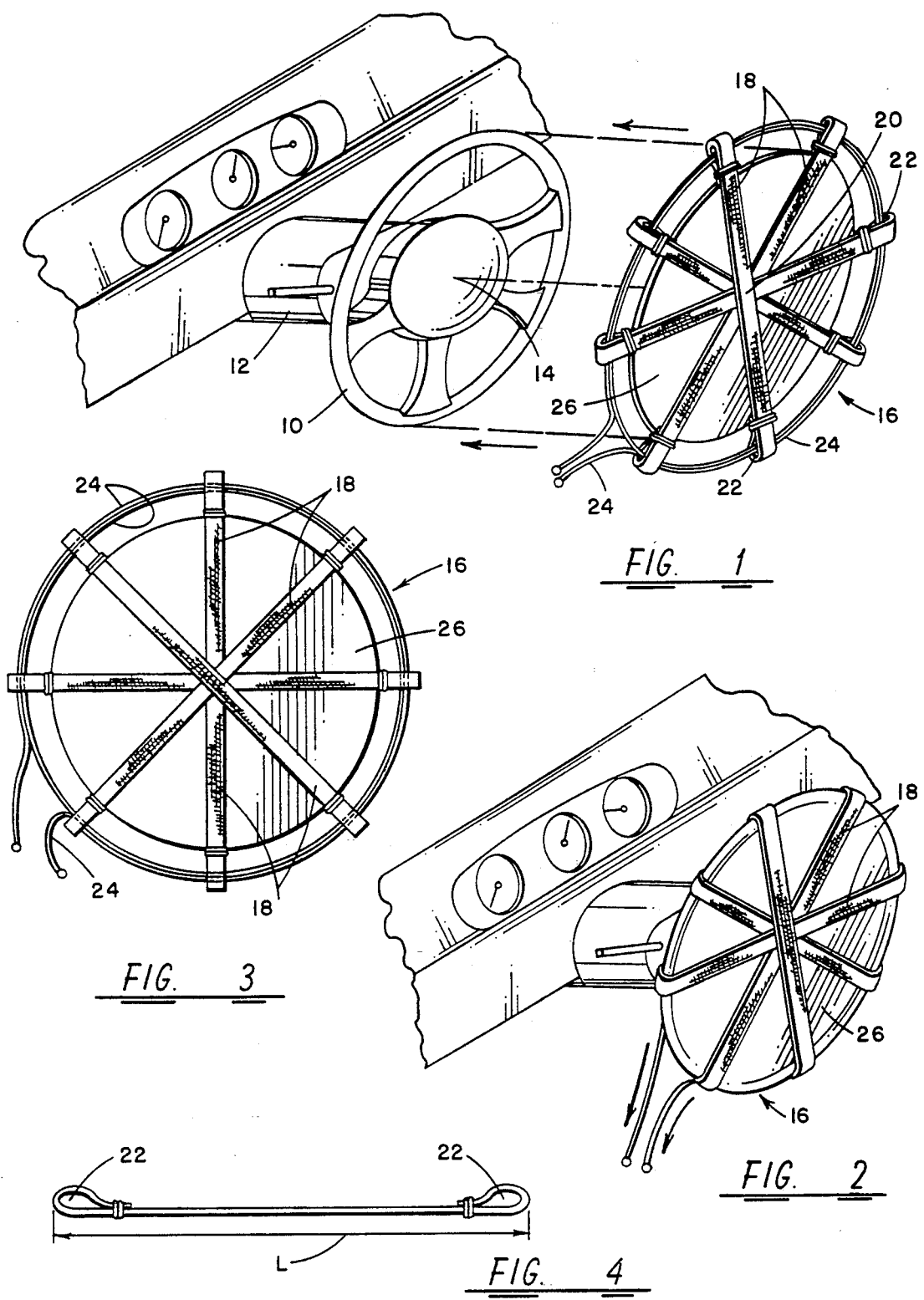

AIR BAG RETENTION DEVICE

BACKGROUND OF THE INVENTION

The present invention relates to air bags for use in vehicles and, more particularly, to an air bag retention apparatus for inhibiting full deployment of an air bag during a rescue operation.

Automobile air bags are designed to open during a front end accident when a vehicle collides solidly with an object at a speed more than about ten miles per hour. The air bag is generally formed of a nylon material which is folded up within a reservoir in the central part of a steering wheel. The air bag is inflated during an accident by a controlled explosion inside the steering column. Once activated, the air bag typically fills to its full capacity in approximately 1/20th of a second. The outer nylon surface of the bag may travel at speeds up to 100 miles per hour during the filling operation. The force with which the air bag is filled and the speed at which the outer surface of the air bag travels has resulted in broken bones and shredded tendons to persons involved in automobile accidents in which the air bag has been activated. In addition, the inflation of the air bag typically releases a mixture of corn starch or talcum powder and a small amount of sodium hydroxide. The sodium hydroxide is generated from the propellant which is used to energize the air bag. Sodium hydroxide is a skin and eye irritant and has been known to irritate victims in an auto accident.

While the air bag has been very successful in saving the lives of numerous persons involved in head-on collisions, one drawback of the air bag is that it is typically activated only by a head-on collision. The sensors which are used to activate the air bag are normally located in the front of the vehicle for that purpose. In some accidents in which the collision occurs from a side or at a non-direct head-on angle, the air bag may not be actuated during the collision. Subsequently, rescue persons attempting to remove a victim from the wrecked automobile run the risk that the air bag may be activated by jostling or movement of the steering wheel during the rescue operation. If the rescue person is in an area between the steering wheel and a victim at a time when the air bag is inadvertently activated, severe injury may occur to both the rescuer and the accident victim. Accordingly, it is desirable to provide a means for inhibiting full deployment of an air bag during a rescue operation.

SUMMARY OF THE INVENTION

The present invention comprises an apparatus for inhibiting full deployment of an air bag in a vehicle during a rescue operation by confining the deployment of the air bag to a predetermined restricted area. More particularly, in a vehicle in which an air bag is located in a central hub of a steering wheel, the present invention provides a cover which may be tightly fitted over the steering wheel and fastened about an underside of the wheel such that any activation of the air bag will be restricted by the cover. In one form, the cover comprises a generally round sheet of flexible material having a diameter greater than a diameter of the vehicle's steering wheel. A drawstring or other suitable means is connected to a periphery of the sheet of material so that the edges or periphery of the sheet may be drawn tightly about the under side of the steering wheel and fastened together so as to prevent the sheet from being forced off the steering wheel upon deployment of an air bag. The sheet forces the explosive gas mixture within the air bag to be discharged downward along the column of the steering wheel and away from the passenger compartment of the vehicle. In another form, the invention comprises a plurality of criss-crossed straps which may be placed over the steering wheel in the same manner as the aforementioned sheet of flexible material. Each end of the plurality of straps is formed with a closed loop and a drawstring threaded through the closed loop allowing the straps to be pulled tightly about the steering wheel and prevent the full deployment of an air bag in the steering wheel.

BRIEF DESCRIPTION OF THE DRAWINGS

For a better understanding of the present invention, reference may be had to the following detailed description taken in conjunction with the accompanying drawings in which:

FIG. 1 is a air bag retention apparatus in accordance with the present invention in position for attachment to a steering wheel;

FIG. 2 illustrates the apparatus of FIG. 1 in a fastened position about a vehicle steering wheel;

FIG. 3 is a top planar view of one form of the inventive air bag retention apparatus; and FIG. 4 is a side view of a strap for use with the present invention.

DETAILED DESCRIPTION

Turning now to FIG. 1, a steering wheel 10 and steering column 12 are shown in their normal angular orientation and include a central hub area 14 which may contain an air bag. The inventive air bag retention apparatus 16 is positioned for connection to the steering wheel 10. The apparatus 16 comprises a plurality of criss-crossed strips, 18, preferably of a reinforced nylon material, each attached to one another at a central point 20. Each of the strips 18 terminates in a closed loop 22. A cord or drawstring 24 passes through each of the closed loops 22 of each of the strips 18. In a preferred form, the drawstring passes through each loop 22 twice, i.e., twice around the periphery of the strips to provide additional restraining strength. The apparatus 16 may also include a generally round sheet 26 of flexible material having a diameter slightly larger than steering wheel 10 or at least approximately the same size as steering wheel 10. When the apparatus 16 is placed over the steering wheel 10, as shown in FIG. 2, the drawstring 24 may be pulled tightly to pull the end loops 22 of each of the strips 18 towards each other so as to form an opening having a smaller diameter than the diameter of the steering wheel 10. When the apparatus 16 is placed on the steering wheel as shown in FIG. 2, the small opening is formed on the underside of the steering wheel so that when the ends of the drawstrings 24 are fastened together, the apparatus 16 is prevented from being removed in a forward direction from the wheel 10. Consequently, if the air bag is deployed after the apparatus 16 is attached to the steering wheel, the air bag will be restrained against full deployment causing the gases generated by the explosive charge in the air bag to be dispersed downward along the steering column and away from the passenger compartment of the vehicle.

While the preferred form of the invention utilizes the plurality of strips 18 for preventing full deployment of an air bag, it will be appreciated that the sheet 26 could be formed of suitable material such as reinforced nylon or canvas and provided with a hem through which the drawstring 24 could be passed. In that instance, the sheet 26 would be formed as a round sheet having a diameter larger than the diameter of the steering wheel 10 so that when the sheet is placed over the steering wheel 10, pulling on the drawstring 24 would draw the periphery of the sheet about the underside of the steering wheel in the same manner as is done with the strips 18. The advantage of utilizing the strips 18 is that nylon strips or straps such as are used for seat belts in automobiles is readily available and can be utilized to form the apparatus 16 with a lighter weight than would result from utilizing a heavier nylon material to create a uniform sheet suitable for restraining the force of an exploding air bag.

Turning now to FIG. 3, there is shown a top view of a preferred form of the present apparatus 16 as shown in FIG. 1 and illustrates a device employing four uniformly angularly oriented nylon straps or strips 18 and a central nylon cloth attached to the straps 18. In a preferred form, the generally round sheet 26 is approximately sixteen inches in diameter and the strips 18 are approximately twenty inches in length. Referring briefly to FIG. 4, it can be seen that each of the strips 18 is formed with a closed loop 22 at each end by sewing the ends of the strips back to a major portion of the strip. As noted above, the length L of the strip 18 is preferably twenty inches while the width of each of the strips is preferably about one inch.

While the invention has been described in what is presently considered to be a preferred embodiment, other modifications and variations will become apparent to those skilled in the art. It is intended therefore that the invention not be limited to the specific disclosed embodiments but be interpreted within the full spirit and scope of the appended claims.

What is claimed is:

1. Apparatus for inhibiting full deployment of an air bag in a vehicle, the air bag being deployed from a hub region of a steering wheel of the vehicle, the apparatus comprising:

a generally round sheet of flexible material having a diameter greater than a diameter of a vehicle steering wheel, said sheet comprising at least a pair of reinforcing strips criss-crossing said sheet; and means connected to a periphery of said sheet for forming said sheet into a generally bag-like configuration having an opening smaller than the diameter of the steering wheel, whereby when said sheet is positioned on the steering wheel the periphery can be formed about an underside of the steering wheel for preventing full deployment of an air bag contained within the steering wheel.

2. The apparatus of claim 1 wherein said forming means comprises a drawstring attached to the periphery of said sheet.

3. The apparatus of claim 2 wherein said sheet includes a hem formed about the periphery of said sheet and having an opening for passage of said drawstring.

4. The apparatus of claim 1 wherein each end of each of said pair of strips terminates in a closed loop, said forming means comprising a drawstring passing through each of said loops.

5. The apparatus of claim 4 wherein said drawstring passes twice around the periphery of said sheet through said loops.

6. The apparatus of claim 4 and including a second pair of strips criss-crossing said sheet, each strip of each of said pairs of strips being angularly displaced with respect to each other.

7. Apparatus for inhibiting full deployment of an air bag in a vehicle, the air bag being deployed from a hub region of a steering wheel of the vehicle, the apparatus comprising:

a plurality of angularly spaced strips of generally uniform length and width, each of said strips being attached to each other at a generally central area and each of said strips terminating in a closed loop at each end thereof, the length of said strips including said loops being greater than the diameter of a steering wheel;

a drawstring passing at least once through each of said loops for drawing said ends of said strips into a generally circular form having a diameter less than a diameter of a vehicle steering wheel, whereby when said strips are positioned on the steering wheel, the ends of said strips can be drawn about an underside of the steering wheel for inhibiting full deployment of an air bag contained within the steering wheel; and a generally circular sheet of flexible material sewn onto said strips, said sheet having a diameter approximately equal to the diameter of the steering wheel.

8. The apparatus of claim 7 wherein said plurality of strips comprising four generally uniformly spaced strips.

* * * * *